United States Patent [19]
Mizuno et al.

[11] Patent Number: 6,099,383
[45] Date of Patent: Aug. 8, 2000

[54] LENS GRINDING APPARATUS

[75] Inventors: Toshiaki Mizuno; Ryoji Shibata, both of Aichi, Japan

[73] Assignee: Nidek Co., Ltd., Aichi, Japan

[21] Appl. No.: 09/021,275

[22] Filed: Feb. 10, 1998

[51] Int. Cl.$^7$ ................................................. B24B 49/00
[52] U.S. Cl. ................................. 451/5; 451/43; 451/256
[58] Field of Search .................................. 451/5, 10, 11, 451/14, 43, 44, 210, 255, 256

[56] References Cited

U.S. PATENT DOCUMENTS

| | | | |
|---|---|---|---|
| 4,423,569 | 1/1984 | Stern et al. | 51/101 LG |
| 4,612,736 | 9/1986 | Massard et al. | 51/284 E |
| 5,228,242 | 7/1993 | Matsuyama | 51/165.74 |
| 5,257,198 | 10/1993 | Van Schoyck | 364/474.02 |
| 5,321,915 | 6/1994 | Lecerf et al. | 51/165.72 |
| 5,333,412 | 8/1994 | Matsuyama | 51/165.71 |
| 5,347,762 | 9/1994 | Shibata | 451/15 |
| 5,371,974 | 12/1994 | Lecerf et al. | 451/5 |
| 5,588,899 | 12/1996 | Gottschlad | 451/5 |
| 5,716,256 | 2/1998 | Mizuno et al. | 451/5 |
| 5,727,987 | 3/1998 | Gottschlad | 451/5 |
| 5,803,793 | 9/1998 | Mizuno et al. | 451/5 |

*Primary Examiner*—Timothy V. Eley
*Assistant Examiner*—Dung Van Nguyen
*Attorney, Agent, or Firm*—Sughrue, Mion, Zinn, Macpeak & Seas, PLLC

[57] ABSTRACT

A lens grinding apparatus is improved to ensure that the angular edge portions of an eyeglass lens are easily ground to a desired shape. The improved lens grinding apparatus includes an input device for entering data on the processing shape of the lens, a detector for detecting the edge position of the lens on the basis of the entered shape data, a first calculator for determining processing data on the rough and fine processings of the lens on the basis of the detected edge position and the entered shape data, an angular edge portion processor which has a grinding wheel to process the angular edge portions of the finely processed lens and which moves the shaft of said grinding wheel relative to a shaft holding the lens, a second calculator which sets a plurality of zones of the lens and which performs different calculations in different zones such that the amount of processing the angular edge portions is determined in correspondence with the radius vector angle of the lens, and a controller for controlling the processing of the lens on the basis of the results of calculation by said first and second calculators.

40 Claims, 13 Drawing Sheets m : n = 4 : 6 m : n = 4 : 6
Δd = 0.3

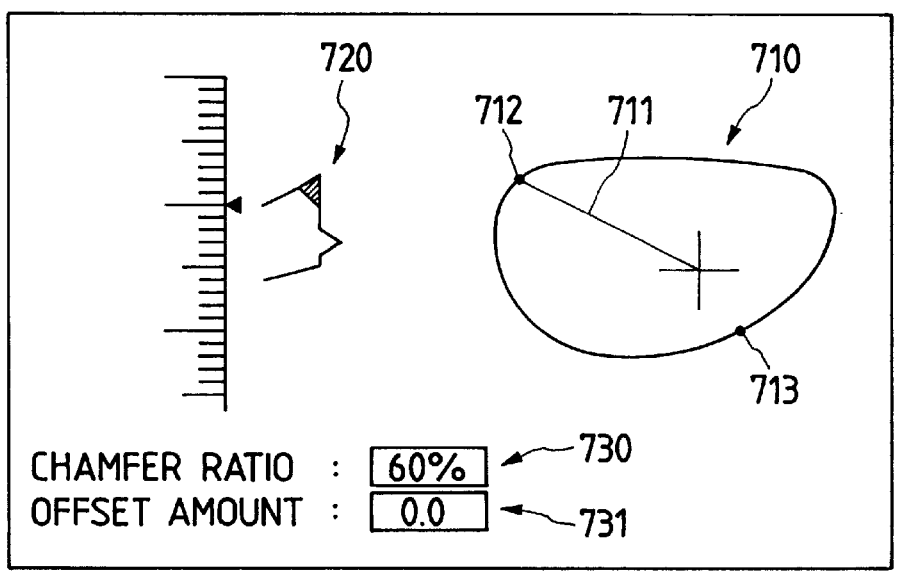

LENS GRINDING APPARATUS

BACKGROUND OF THE INVENTION

The present invention relates to a lens grinding apparatus which is used to grind the periphery of an eyeglass lens, more particularly, to an apparatus suitable for grinding the angular edge portions of the eyeglass lens.

An apparatus is known in the art which grinds an eyeglass lens so that it fits into an eyeglasses frame. In an optician's shop, an optician processes the periphery of each eyeglass lens so that it is provided with a bevel or a groove which fit into an eyeglasses frame selected by a customer and he then mounts the processed lens into the frame.

The thus ground lens has an angular portion at both front and rear ends of the edge. If such angular portions are left intact, they may possibly hurt the user or become a cause of breakage or other damage of the lens. Therefore, it is common practice for lens processors to chamfer the angular edge portions of the lens.

Conventionally, chamfering is performed with a hand grinder having a rotating grinding wheel bounded by conical slopes and the optician who holds a lens urges its edge into contact with the chamfering wheel and chamfers the angular edge portions to give the desired shape under visual checking.

However, chamfering with the hand grinder requires skill and is not easy to accomplish in a manner to give satisfactory results. For an unskilled optician, the operation is time-consuming and does not guarantee grinding to the intended shape. In addition, considerable burden is imposed on the optician.

Under the circumstances, it has been proposed that the lens grinding apparatus be provided with a chamfering capability so that chamfering can be effected automatically. In this type of apparatus, the lens held on a rotating shaft and the chamfering wheel are both rotated and the edge of the lens is chamfered while effecting control in such a way as to change the edge position of the lens relative to the chamfering wheel's surface.

For successful control of the chamfering operation, it is necessary that the three-dimensional positions of the lens rotating shaft and the chamfering wheel be determined to satisfy an appropriate relationship. However, if a sufficient allowance is provided with a view to ensuring that the chamfering wheel will not interfere with the lens rotating shaft, the smallest diameter of the lens that can be processed increases, making it difficult to process lenses of small minimum diameter such as a pince-nez.

In addition, a lens having a negative power increases in edge thickness with increasing diopter. Further, the edge thickness varies from one area to another in accordance with its shape. If such lenses are mounted on an eyeglasses frame having a comparatively thin rim, the edge of each lens projects so much from the rim of the eyeglasses frame that the customer often refuses to wear the eyeglasses because they are unseemly or have other defects.

Speaking of rimless eyeglasses which have recently gained popularity among users, the entire part of the edge portions is visible to the outside, making the aesthetic appeal of the eyeglasses more important.

SUMMARY OF THE INVENTION

In view of this, it is an object of the present invention to provide a lens grinding apparatus with which the angular edge portions of a lens can be easily ground or chamfered to the desired shape.

Another object of the present invention is to provide a lens grinding apparatus with which the angular edge portions of the lens can be ground to give a seemly appearance.

Yet another object of the invention is to provide a lens grinding apparatus with which the desired amount of chamfer can be easily designated and entered in accordance with a specified edge thickness.

Still another object of the present invention is to provide a lens grinding apparatus that makes more effective use of the width of a chamfering wheel so that it will not interfere with a lens rotating shaft, thereby reducing the smallest diameter of the lens that can be processed and allowing for easy control of the smallest lens diameter.

To attain the above-noted object, the present invention provides lens grinding apparatuses having the following features:

(1) A lens grinding apparatus for grinding the periphery of an eyeglass lens, comprising:

input means for entering data on the processing shape of the lens;

means for detecting the edge position of the lens on the basis of the entered shape data;

first calculating means for determining processing data on the rough and fine processings of the lens on the basis of the edge position detected by the detecting means and the shape data entered into the input means;

angular edge portion processing means which has a grinding wheel to process the angular edge portions of the finely processed lens and which moves the shaft of the grinding wheel relative to a shaft holding the lens;

second calculating means which sets a plurality of zones of the lens and which performs different calculations in different zones such that the amount of processing the angular edge portions is determined in correspondence with the radius vector angle of the lens; and means for controlling the processing of the lens on the basis of the results of calculation by the first and second calculating means.

(2) The lens grinding apparatus as set forth in (1), wherein the second calculating means has means by which the edge thickness determined on the basis of the result of detection by the edge position detecting means is divided by a specified ratio in accordance with a specified format.

(3) The lens grinding apparatus as set forth in (2), wherein the second calculating means further includes means for offsetting the point of the division in a direction parallel to the shaft holding the lens.

(4) The lens grinding apparatus as set forth in (2), wherein the edge thickness to be divided by the dividing means is the thickness of a bevel at the bottom after bevel or groove formation.

(5) The lens grinding apparatus as set forth in (1), wherein the second calculating means has means by which an operator designates a zone in which a different calculation is performed than in other zones.

(6) The lens grinding apparatus as set forth in (5), wherein the zone designating means has means for providing a graphic display of the approximate shape of the processed lens on the basis of the results of calculation by the first and second calculating means.

(7) The lens grinding apparatus as set forth in (1), wherein the input means has input means for entering data on the processing shape of a rimless eyeglass lens.

(8) A lens grinding apparatus for grinding the periphery of an eyeglass lens, comprising:

input means for entering data on the processing shape of the lens;

means for detecting the edge position of the lens on the basis of the data entered into the input means;

first calculating means for determining processing data on the rough and fine processings of the lens on the basis of the edge position detected by the detecting means and the data entered into the input means;

chamfering means which has a grinding wheel for chamfering the angular edge portions of the finely processed lens and which moves the shaft of the chamfering wheel relative to a shaft holding the lens;

second calculating means which varies the amount of chamfer in correspondence with the radius vector angle of the lens on the basis of the processing data obtained by the first calculating means; and means for controlling the processing of the lens on the basis of the results of calculation by the first and second calculating means.

(9) The lens grinding apparatus as set forth in (8), wherein the second calculating means has means by which the edge thickness determined on the basis of the result of detection by the edge position detecting means is divided by a specified ratio in accordance with a specified format for the entire periphery of the lens.

(10) The lens grinding apparatus as set forth in (9), wherein the edge thickness to be divided by the dividing means is the thickness of a bevel at the bottom after bevel or groove formation.

(11) The lens grinding apparatus as set forth in (9), wherein the second calculating means further includes means by which the point of division as obtained through division by the dividing means on the basis of a specified ratio is offset in a direction parallel to the shaft holding the lens.

(12) The lens grinding apparatus as set forth in (11), which further includes means by which an operator instructs the entry of at least either the ratio of division or the amount of offset or both.

(13) The lens grinding apparatus as set forth in (8), which further includes means for providing a graphic display of the shape of the angular edge portions of the lens on the basis of the results of calculation by the first and second calculating means.

(14) The lens grinding apparatus as set forth in (13), which further includes input means for changing the shape of the displayed angular edge portions.

(15) The lens grinding apparatus as set forth in (13), which further includes means by which the angular edge portions to be displayed on the display means is designated either on demand or in advance.

(16) The lens grinding apparatus as set forth in (8), wherein the second calculating means includes means which sets a plurality of zones of the lens and which performs different calculations in different zones such that the amount of processing the angular edge portions is determined in correspondence with the radius vector angle of the lens.

(17) The lens grinding apparatus as set forth in (8), wherein the second calculating means includes:

means for determining a chamfering locus in correspondence with the radius vector angle of the lens;

calculating means for determining a reference chamfering locus on the basis of the chamfering locus;

calculating means for determining a corrected locus by correcting the reference locus such as to ensure that the chamfering wheel will not interfere with the lens holding means; and calculating means for determining the chamfering position for successive angles of rotation on the basis of the corrected locus and the chamfering locus, wherein the means for controlling controls rough and fine processings by the processing data, and controls the chamfering operation on the basis of the chamfering position and the corrected locus.

(18) A lens grinding apparatus for grinding the periphery of an eyeglass lens, comprising:

input means for entering data on the processing shape of the lens;

means for detecting the edge position of the lens on the basis of the data entered into the input means;

first calculating means for determining processing data on the rough and fine processings of the subject lens on the basis of the edge position detected by the detecting means and the data entered into the input means;

chamfering means which has a grinding wheel with conical grinding surfaces for chamfering the angular edge portions of the finely processed lens and which moves the shaft of the chamfering wheel relative to means for holding the lens;

means for determining a chamfering locus in correspondence with the radius vector angle of the lens;

second calculating means for determining a reference chamfering locus on the basis of the chamfering locus;

third calculating means for determining a corrected locus by correcting the reference locus such as to ensure that the chamfering wheel will not interfere with the lens holding means;

fourth calculating means for determining the chamfering position for successive angles of rotation on the basis of the corrected locus and the chamfering locus; and means for controlling rough and fine processings by the processing data and which controls the chamfering operation on the basis of the chamfering position and the corrected locus.

(19) The lens grinding apparatus as set forth in (18), wherein the shaft of the lens holding means and that of the chamfering wheel are disposed parallel to each other and wherein the fourth calculating means determines a maximum value of Z in the following equation:

$$(x-X)^2+(y-Y)^2=(z-Z)^2\tan^2\theta$$

where

X: the distance along the X-axis between the centers of the lens holding means and the chamfering wheel;

Y: the distance along the Y-axis between the centers of the lens holding means and the chamfering wheel;

Z: the distance along the Z-axis from a reference position to the imaginary apex of the chamfering wheel; and $\theta$: the angle of inclination of a surface of the chamfering wheel along the Z-axis, where the X- and Y-axes are orthogonal coordinate axes in a plane perpendicular to the shaft of the lens holding means, and the Z-axis is a coordinate axis in a direction parallel to the shaft of the lens holding means.

(20) The lens grinding apparatus as set forth in (19), which sends a signal for "processing impossible" to the operator when the position for a maximum diameter of the chamfering wheel as determined from the maximum value of the Z is smaller than a specified reference.

BRIEF DESCRIPTION OF THE DRAWINGS

In the accompanying drawings:

FIG. 10 shows a screen displaying an entered amount of chamfer and a simulating image;

FIG. 11 shows plural sets of chamfer ratio and offset amount in a tabulated form from which appropriate values are to be selected;

DESCRIPTION OF THE PREFERRED EMBODIMENT

A lens grinding apparatus according to an embodiment of the present invention will be hereinafter described with reference to the accompanying drawings.

Configuration of Whole Apparatus

Figure 1:
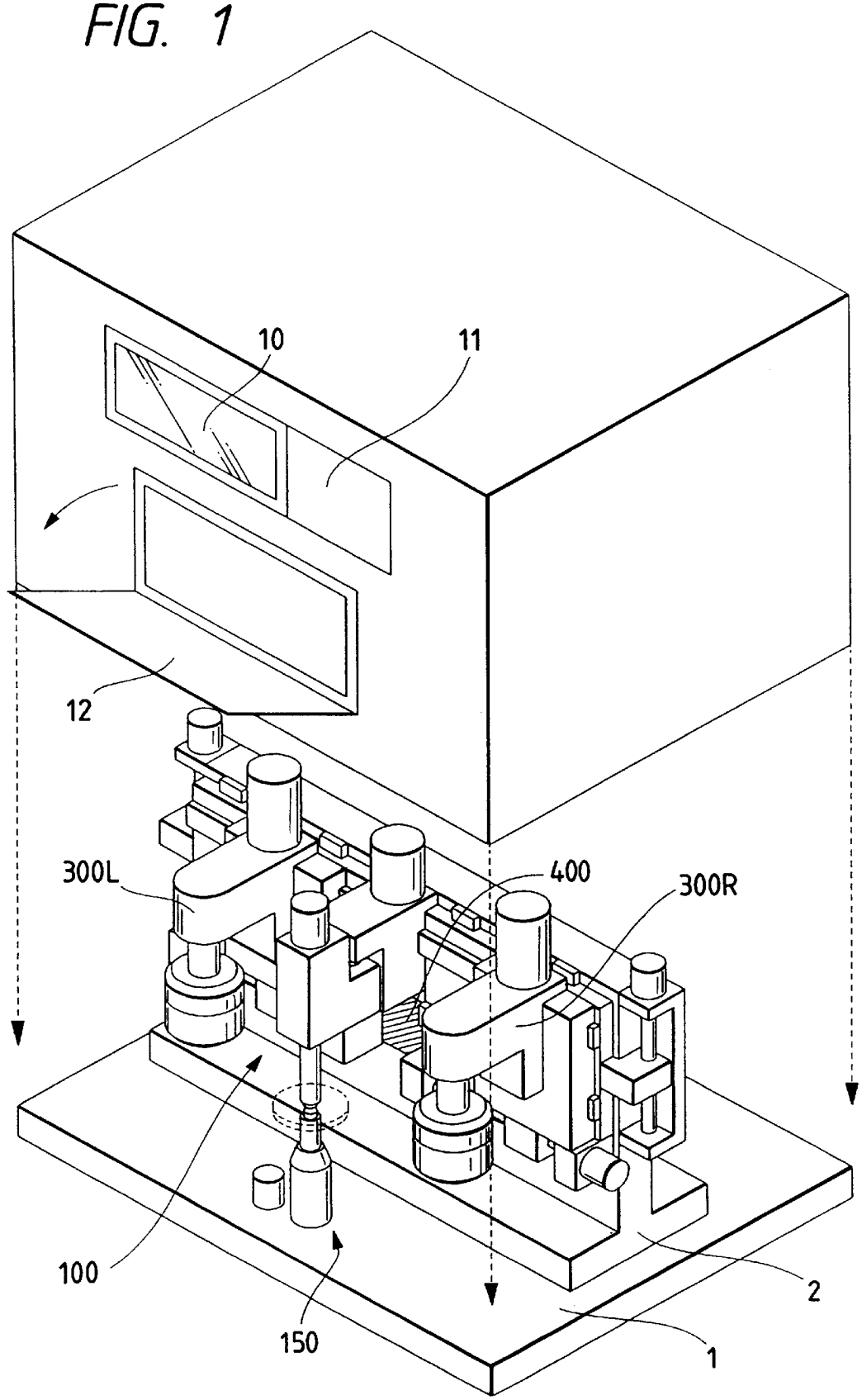
FIG. 1 is a perspective view showing the general configuration of a lens grinding apparatus according to an embodiment of the present invention.

In FIG. 1, reference numeral 1 denotes a main base, and 2 denotes a sub-base that is fixed to the main base 1. A lens chuck upper part 100 and a lens chuck lower part 150 hold a lens to be processed by means of their respective chuck shafts during processing it. A lens thickness measuring section 400 is accommodated below the lens chuck upper part 100 in the depth of the sub-base 2.

Figure 2:
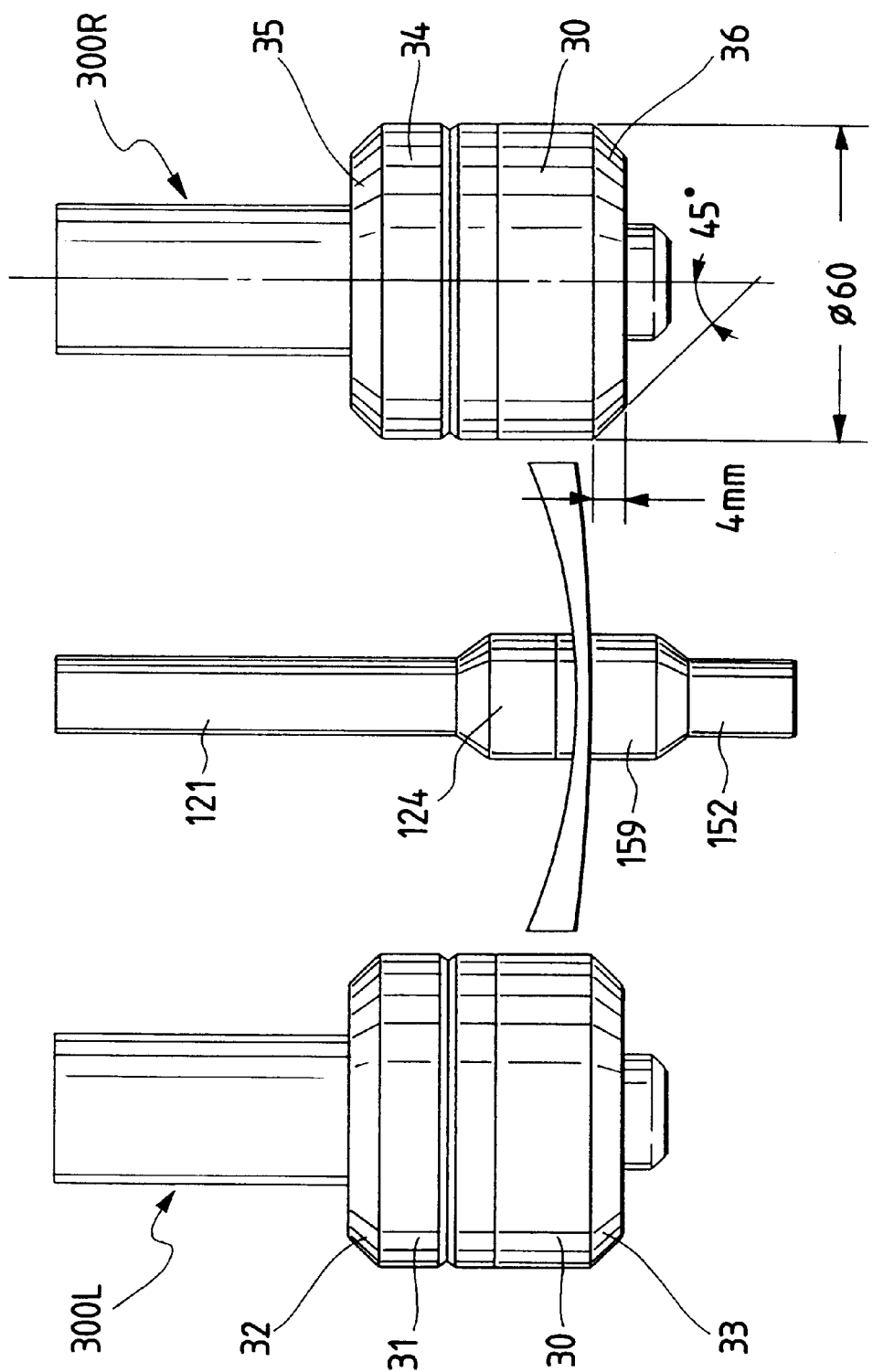
FIG. 2 is a diagram showing the arrangement of grinding wheels in the apparatus of FIG. 1.

Reference symbols 300R and 300L respectively represent right and left lens grinding parts each having grinding wheels for lens grinding on its rotary shaft. Each of the lens grinding parts 300R and 300L is held by a moving mechanism (described later) so as to be movable in the vertical and horizontal directions with respect the sub-base 2. As shown in FIG. 2, a rough grinding wheel 30 for plastics and a finishing grinding wheel 31 are mounted on the rotary shaft of the lens grinding part 300L. Further, a front surface chamfering grinding wheel 32 having a conical surface is coaxially attached to the upper end surface of the finishing grinding wheel 31, while a rear surface chamfering grinding wheel 33 having a conical surface is coaxially attached to the lower end surface of the rough grinding wheel 30. On the other hand, a mirror-finishing grinding wheel 34 is mounted on the rotary shaft of the lens grinding part 300R. A rough grinding wheel 30 for plastics which is the same as that of the lens grinding part 300L, a front surface mirror-chamfering grinding wheel 35 having a conical surface, and a rear surface mirror-chamfering grinding wheel 36 having a conical surface are coaxially mounted on the rotary shaft of the lens grinding part 300R. The diameter of these grinding wheels are relatively small, that is, about 60 min. The chamfering surface of each of the chamfering grinding wheels 32, 33, 35 and 36 is 4 mm in height and 45° in inclination.

A display unit 10 for displaying processing data and other information and an input unit 11 for allowing a user to input data or an instruction to the lens grinding apparatus are provided in the front surface of a body of the apparatus. Reference numeral 12 denotes a closable door.

Structures of Main Parts

<Lens Chuck Part>

Figure 3:
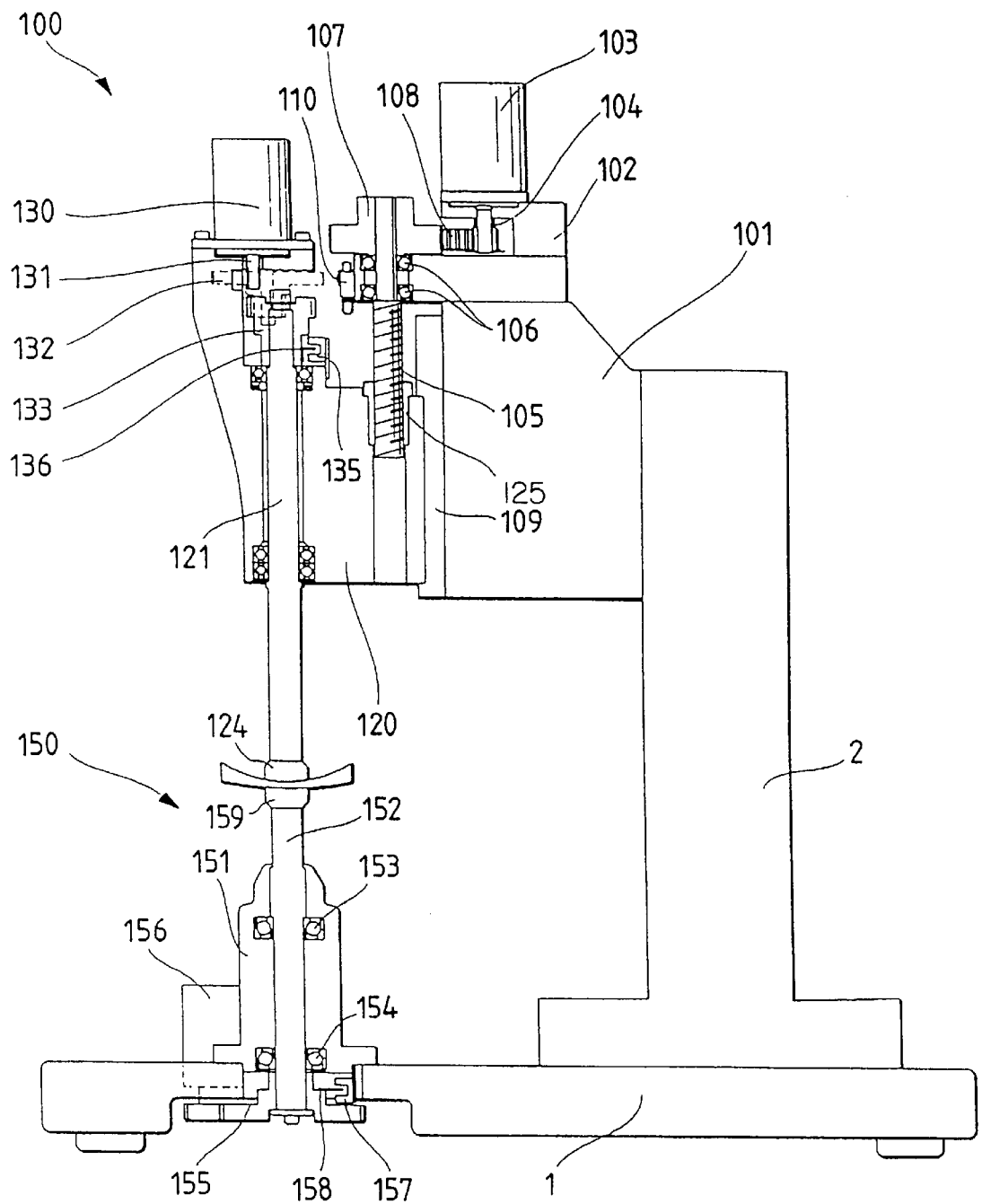
FIG. 3 is a side view showing the upper and lower parts of a lens chuck which are respectively indicated by 100 and 150.

FIG. 3 illustrates the lens chuck upper part 100 and the lens chuck lower part 150.

(1) Lens Chuck Upper Part

A fixing block 101 is fixed to the sub-base 2. A DC motor 103 for vertically moving a chuck shaft 121 is mounted on top of the fixing block 101 by means of a mounting plate 102. The rotational force of the DC motor 103 is transmitted through a pulley 104, a timing belt 108 and a pulley 107 to a feed screw 105. As the feed screw 105 is rotated, a nut 125 meshing with the feed screw 105 drives a chuck shaft holder 120 vertically while being guided by a guide rail 109 fixed to the fixing block 101. A micro switch 110 is mounted on the fixing block 101, which detects a reference position when the chuck shaft holder 120 is elevated.

A pulse motor 130 for rotating the chuck shaft 121 is fixed to the top portion of the chuck shaft holder 120. The rotational force of the pulse motor 130 is transmitted, via a gear 131 that is attached to its rotary shaft and a relay gear 132, to a gear 133 that is attached to the chuck shaft 121, to rotate the chuck shaft 121. Reference numeral 124 denotes a lens holder attached to the chuck shaft 121.

Reference numeral 135 denotes a photosensor and 136 denotes a light-shielding plate that is mounted on the chuck shaft 121. The photosensor 135 detects a rotation reference position of the chuck shaft 121.

(2) Lens Chuck Lower Part

A lower chuck shaft 152 is rotatably held by a chuck shaft holder 151 through bearings 153 and 154, and the chuck shaft holder 151 is fixed to the main base 1. A gear 155 is fixed to the bottom end of the chuck shaft 152. The rotational force of a pulse motor 156 is transmitted to the chuck shaft 152 by a gear arrangement (not shown) that is similar to the counterpart in the upper chuck part, to rotate the chuck shaft 152. Reference numeral 159 denotes a lens holder attached to the chuck shaft 152.

Reference numeral 157 denotes a photosensor and 158 denotes a light-shielding plate that is mounted on the gear 155. The photosensor 157 detects a rotation reference position of the chuck shaft 152.

<Moving Mechanism for Lens Grinding Part>

Figure 4:
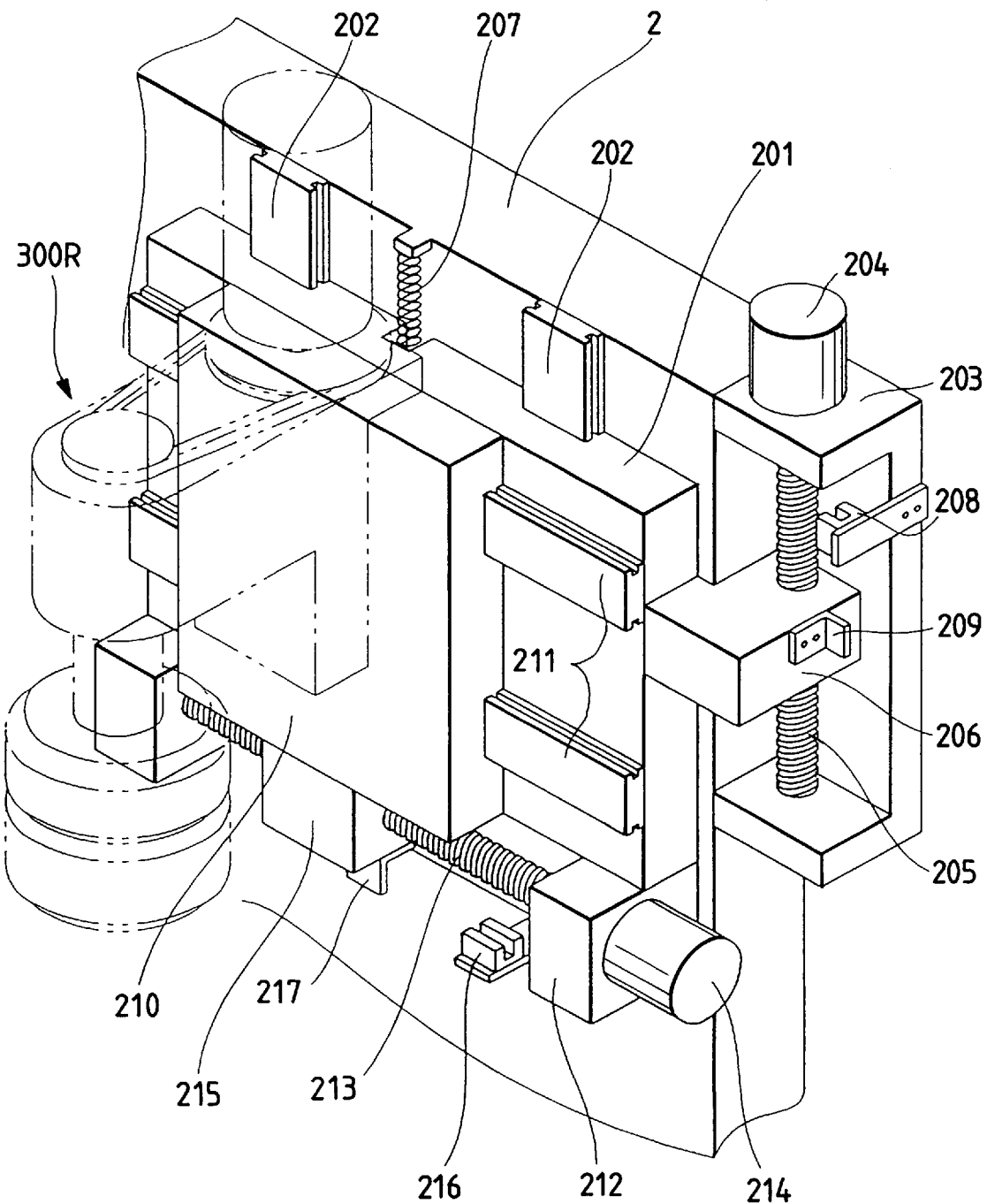
FIG. 4 is a perspective view showing the mechanism for moving a lens grinding part 300R.

FIG. 4 illustrates a mechanism for moving the right lens grinding part 300R. (Since a moving mechanism for the left lens grinding part 300L is symmetrical with that for the right lens grinding part 300R, it will not be described.)

A vertical slide base 201 is vertically slidable along two guide rails 202 that are fixed to the front surface of the sub-base 2. A bracket-shaped screw holder 203 is fixed to the right side surface of the sub-base 2. A pulse motor 204R is fixed to the upper end of the screw holder 203, and a ball screw 205 that is rotatably held by the screw holder 203 is coupled to the rotary shaft of the pulse motor 204R. A nut block 206 has a nut which is threadedly engaged with the ball screw 205, and is fixed to the side surface of the vertical slide base 201. When the pulse motor 204R rotates the ball screw 205, the vertical slide base 201 is moved accordingly in the vertical direction while being guided by the guide rails 202. A spring 207 is provided between the sub-base 2 and the vertical slide base 201. That is, the spring 207 urges the vertical slide base 201 upward to cancel out the downward load of the vertical slide base 201, thereby facilitating its vertical movent.

A photosensor 208R is fixed to the screw holder 203, and a light-shielding plate 209 is fixed to the nut block 206. The photosensor 208R determines a reference position of the vertical movent of the vertical slide base 201 by detecting the position of the light-shielding plate 209.

Reference numeral 210 denotes a horizontal slide base to which the lens grinding part 300R is fixed. The horizontal slide base 210 is slidable in the horizontal direction along two slide guide rails 211 that are fixed to the front surface of the vertical slide base 201. A mechanism for moving the horizontal slide base 210 is basically the same as the above-described moving mechanism for the vertical slide base 201. A bracket-shaped screw holder 212 is fixed to the lower end of the vertical slide base 201, and holds a ball screw 213 rotatably. A pulse motor 214R is fixed to the side surface of the screw holder 212, and the ball screw 213 is coupled to the rotary shaft of the pulse motor 214R. The ball screw 213 is in threaded engagement with a nut block 215 that is fixed to the bottom surface of the horizontal slide base 210. When the pulse motor 214R rotates the ball screw 213, the horizontal slide base 210 that is fixed to the nut block 215 is moved accordingly in the horizontal direction along the guide rails 211.

A photosensor 216R is fixed to the screw holder 212, and a light-shielding plate 217 is fixed to the nut block 215. The photosensor 216R determines a reference position of the horizontal movement of the horizontal slide base 210 by detecting the position of the light-shielding plate 217.

<Lens Grinding Part>

Figure 5:
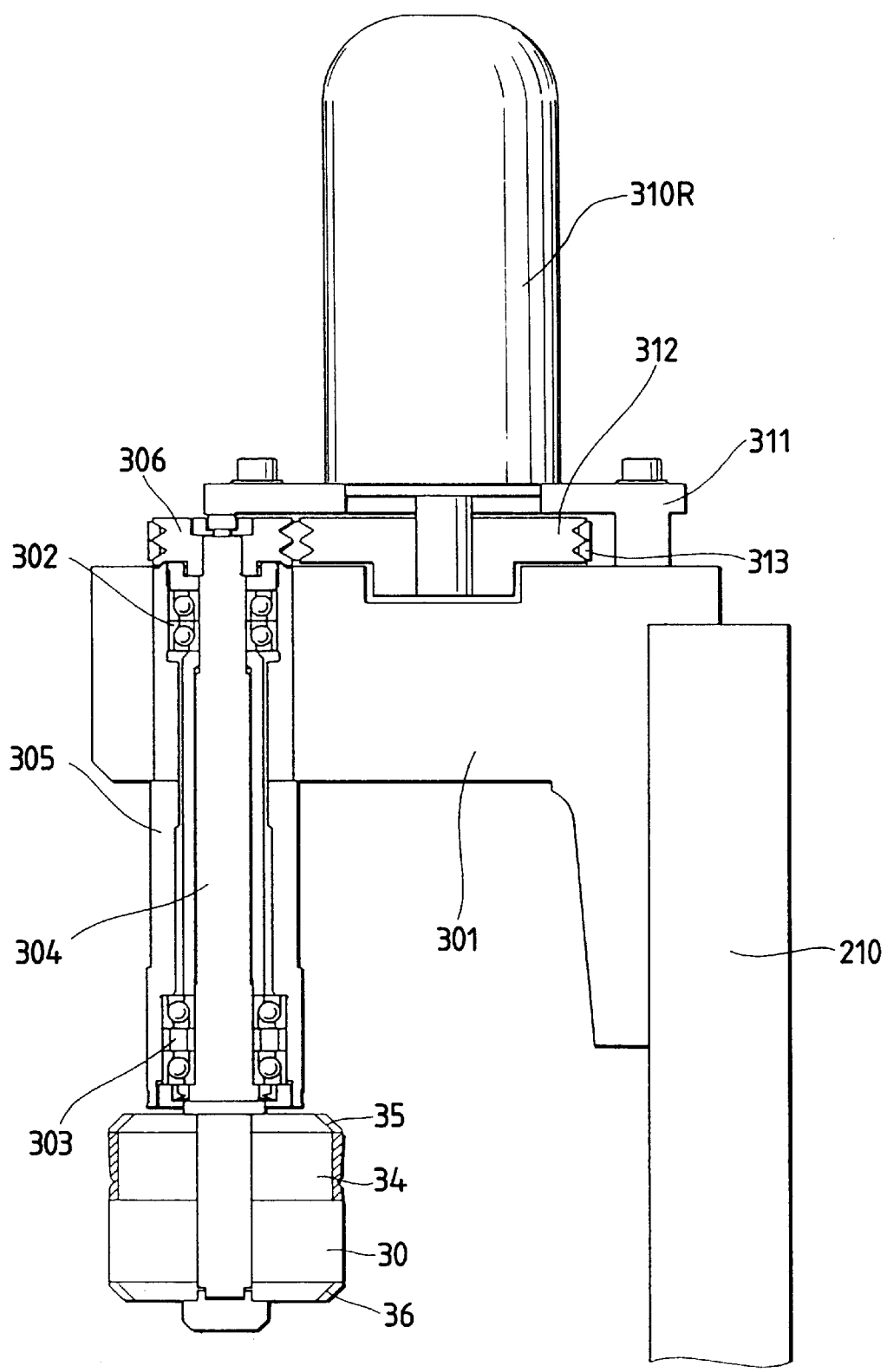
FIG. 5 is a sectional view showing the configuration of the lens grinding part 300R.

FIG. 5 is a side sectional view showing the structure of the right lens grinding part 300R. A shaft support base 301 is fixed to the horizontal slide base 210. A housing 305 is fixed to the front portion of the shaft support base 301, and rotatably holds therein a vertically extending rotary shaft 304 through bearings 302 and 303. A group of grinding wheels including a rough grinding wheel 30 and so on are mounted on the lower portion of the rotary shaft 304.

A servo motor 310R for rotating the grinding wheels is fixed to the top surface of the shaft support base 301 through a mounting plate 311. The rotational force of the servo motor 310R is transmitted via a pulley 312, a belt 313 and a pulley 306 to the rotary shaft 304, thereby rotating the group of the grinding wheels.

Since the left lens grinding part 300L is symmetrical with the right lens grinding part 300R, its structure will not be described.

Figure 6:
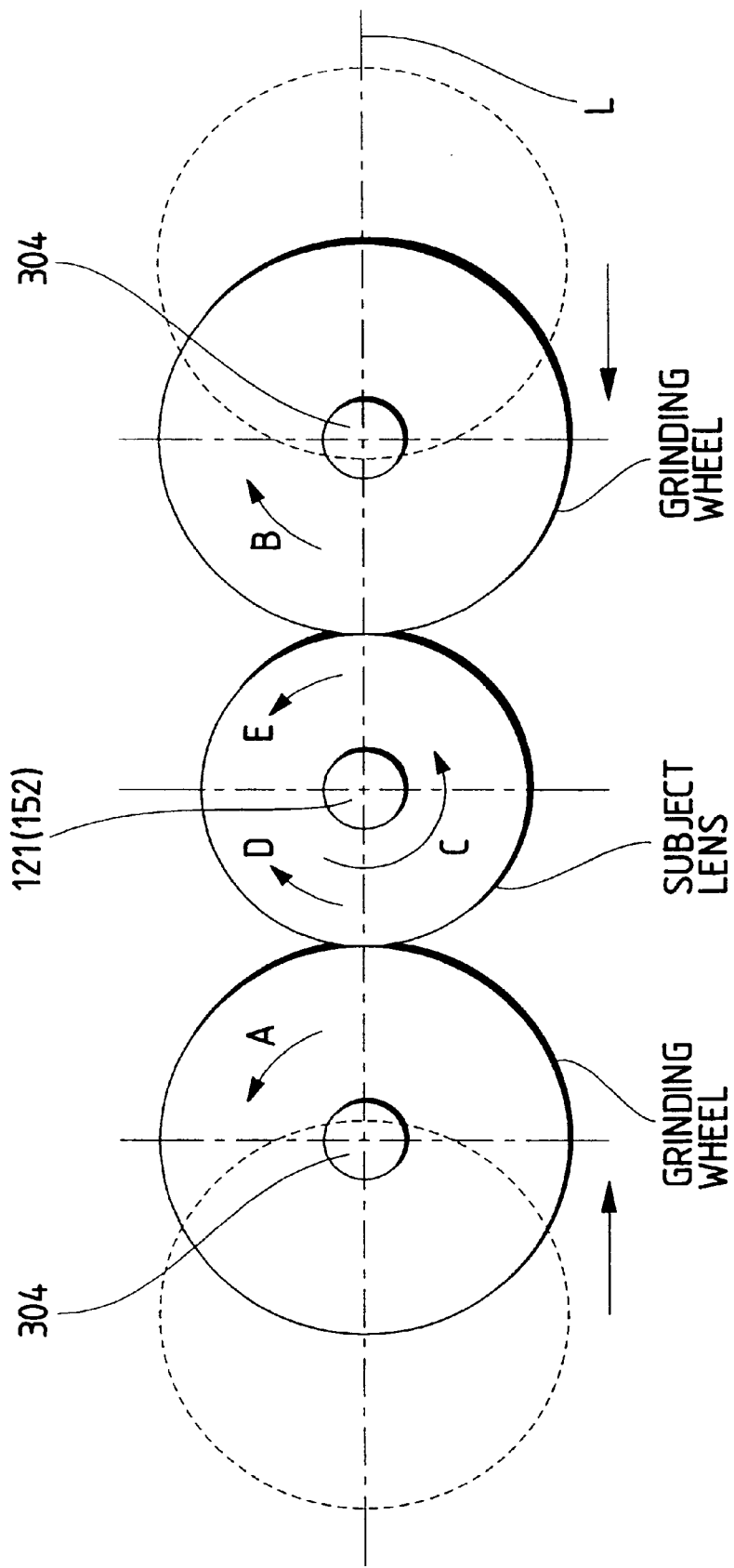
FIG. 6 is a diagram illustrating how the directions of rotation of the grinding wheels and the lens being processed are related to the rotational loads exerted on the lens.

With the driving control on the pulse motors of the above-described moving mechanisms, each of the right and left lens grinding parts 300R and 300L is moved vertically and horizontally with respect to the lens which is held by the upper and lower chuck shafts 121 and 152. These movements of the right and left grinding parts 300R and 300L bring selected ones of the grinding wheels into contact with the lens, so that the selected grinding wheels grind the lens. It is noted that in this embodiment the rotation axis of the chuck shafts 121 and 152 of the lens chuck upper part 100 and the lens chuck lower part 150 is so arranged as to be located on the straight line connecting the centers of the two respective shafts 304 of the lens grinding parts 300R and 300L (see FIG. 6).

<Lens Thickness Measuring Section>

Figure 7:
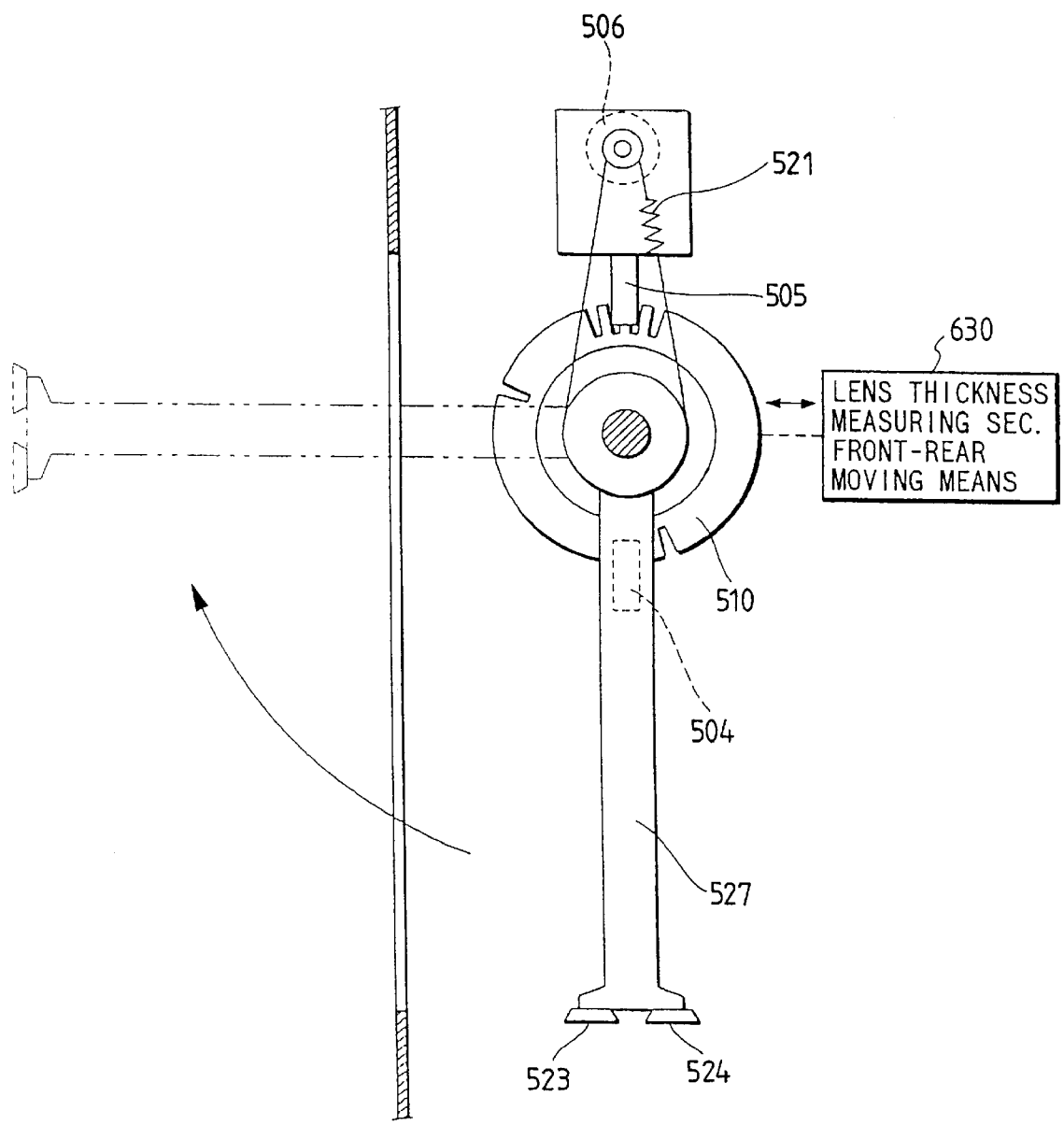
FIG. 7 is a diagram illustrating the action of a lens thickness measuring apparatus 400.

FIG. 7 illustrates the lens thickness measuring section 400 (FIG. 1).

The lens thickness measuring section 400 includes a measuring arm 527 having two feelers 523 and 524, a rotation mechanism such as a DC motor (not shown) for rotating the measuring arm 527, a sensor plate 510 and photo-switches 504 and 505 for detecting the rotation of the measuring arm 527 to thereby allow control of the rotation of the DC motor, a detection mechanism such as a potentiometer 506 for detecting the amount of rotation of the measuring arm 527 to thereby obtain the shapes of the front and rear surfaces of the lens. The configuration of the lens thickness measuring section 400 is basically the same as that disclosed in Japanese Unexamined Patent Publication No. Hei. 3-20603 and U.S. Pat. No. 5,333,412 filed by or assigned to the present assignee, which are referred to for details of the lens thickness measuring section 400. A difference from that disclosed in Japanese publication 3-20603 is that the lens thickness measuring section 400 of FIG. 7 is so controlled as to move in front-rear direction (indicated by arrows in FIG. 7) relative to the lens grinding apparatus by a front-rear moving means 630 based on edge processing data.

The lens thickness (edge thickness) measurement is performed in the following manner. The measuring arm 527 is rotated, that is elevated, so that the feeler 523 is brought into contact with the lens front refraction surface. While keeping the feeler 523 in contact with the lens front refraction surface, the lens is rotated as well as the lens thickness measuring section 400 is controlled to move forward or backward by the front-rear moving means 630, so that the shape of the lens front refraction surface (on the edge of the lens to be formed) is obtained. Then, the shape of the lens rear refraction surface (on the edge of the lens to be formed) is obtained similarly by rotating the lens and by moving the lens thickness measurement section 400 while keeping the feeler 524 in contact with the lens rear refraction surface. Based on the shapes of the lens front and rear refraction surfaces, the lens thickness (edge thickness) is obtained.

The lens thickness is measured such that the measuring arm 527 is rotated upward from its lower initial position and the feelers 523 and 524 are respectively brought into contact with the front and rear refraction surfaces of the lens. Therefore, it is preferable that the rotary shaft of the measuring arm 527 be equipped with a coil spring 521 or the like which cancels out the downward load of the measuring arm 527.

<Control System>

Figure 8:
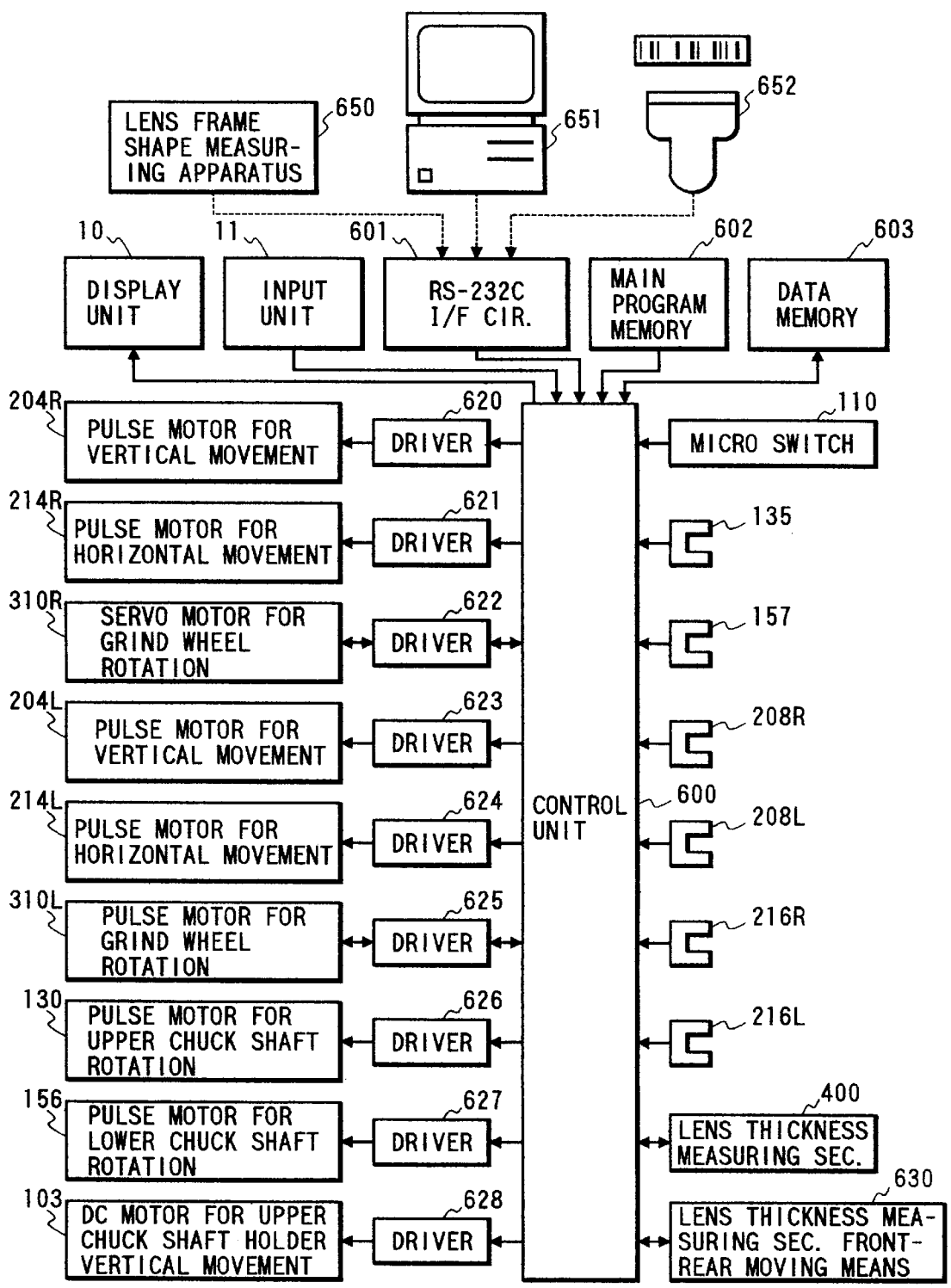
FIG. 8 is a block diagram showing the general configuration of a control system for the apparatus of FIG. 1.

FIG. 8 is a block diagram showing a general configuration of a control system of the lens grinding apparatus.

Reference character 600 denotes a control unit which controls the whole apparatus. The display unit 10, input unit 11, micro switch 110, and photosensors are connected to the control unit 600. The motors for moving or rotating the respective parts are connected to the control unit 600 via drivers 620–628. The drivers 622 and 625, which are respectively connected to the servo motor 310R for the right lens grinding part 300R and the servo motor 310L for the left lens grinding part 300L, detect the torque of the servo motors 310R and 310L during the processing and feed back the detected torque to the control unit 600. The control unit 600 uses the torque information to control the movement of the lens grinding parts 300R and 300L as well as the rotation of the lens.

Reference numeral 601 denotes an interface circuit which serves to transmit and receive data. An eyeglass frame shape measuring apparatus 650, a host computer 651 for managing lens processing data, a bar code scanner 652, etc. may be connected to the interface circuit 601. A main program memory 602 stores a program for operating the lens grinding apparatus. A data memory 603 stores data that are supplied through the interface circuit 601, lens thickness measurement data, and other data.

Operation

The operation of the lens grinding apparatus having the above-described configuration will be hereinafter described.

The optician enters data on the shape of an eyeglasses frame (template) as determined with an eyeglass frame shape measuring apparatus (see, for example, U.S. Pat. No. 5,228,242). Display unit 10 provides a graphic representation of the lens shape (target lens shape) based on the eyeglasses frame data and this makes the apparatus ready for receiving the entry of processing conditions. Looking at the screen of the display unit 10, the optician manipulates input unit 11 to enter layout data such as PD value (and FPD value) and the height of the optical center. Subsequently, the optician enters data on the constituent material of the lens, that of the frame and as to whether the lens is for the right or left eye.

The optician also manipulates the input unit 11 to select the mode to be performed (i.e., bevelling, planing, specular processing (polishing) or the like) and enters the selected mode. At a processing center where orders from many optician's shops are processed in a centralized manner, the various necessary data are transmitted to the computer 651 through public communication lines and processing is done on the basis of the received data. On the pages that follow, an embodiment of the invention is described with reference to the case where bevelling is followed by chamfering.

The optician performs preliminary processing of the lens and places it on the chuck shaft 152. Upon completion of the preparation for processing, the optician depresses START switch on the input unit 11 to start the apparatus.

In response to START signal, the control unit 600 controls the actions of the front-rear moving means 630 and lens thickness measuring section 400 and the rotation of the chucked lens such that the edge position (edge thickness) of the lens in a coordinate system where the position of the optical axis of the lens is at the origin is measured on the basis of the layout information, eyeglass frame shape information (including edge processing data) and the like. On the basis of the obtained information on the edge position and in accordance with a predetermined program, the control unit 600 performs bevel calculations for obtaining data on the bevelling to be performed on the lens. As for the calculation of the bevelling data, there have been proposed several methods including the determination of a curve from front and rear surface curves, dividing the edge thickness and the combination of these two methods. For details of the calculation of the bevelling data, reference may be had to commonly assigned U.S. Pat. No. 5,347,762.

When the calculations for bevelling are completed, the display unit 10 displays the shape of a bevel at the position for minimum edge thickness (the edge position is variable) and the optician, after checking the displayed shape of the bevel, depresses START switch again if there is no problem.

Figure 9A:
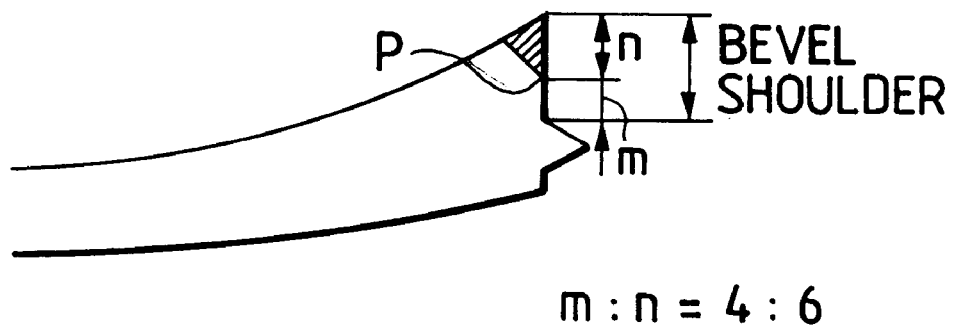
FIGS. 9(a) and 9(b) illustrate how the bevelled edge of the rear surface of a lens is subsequently chamfered on the basis of a ratio.

Subsequently, the screen of the display unit 10 changes to display entered data on the amount of chamfer and provide a simulating image of processing. FIG. 9a illustrates an exemplary case of chamfering which is performed in such a way that the width of bevel shoulder (thickness of bevel bottom) on the rear surface of a bevelled lens is divided at a specified ratio along the entire periphery (alternatively, the edge thickness of the area extending from the front to the rear surfaces of the lens may be divided). The ratio of chamfering the rear surface of the lens is assumed to be 100% if chamfering is continued up to the point where an inclined surface of the bevel crosses the bevel shoulder.

Figure 9B:
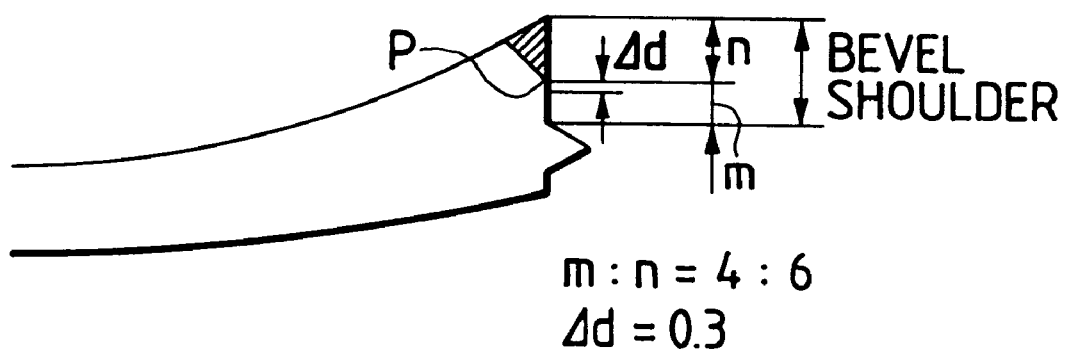

The data on the amount of chamfer can be input by entering the numeral for the chamfer ratio displayed on the simulating image shown in FIG. 10 where the numeral is indicated by 730. If desired, the amount of chamfer which is to be divided at a specified ratio (which is designated as processing point P in FIG. 9a) may be offset such that it makes a parallel shift by $\Delta d$ toward either front or rear surface of the lens (see FIG. 9b). In this alternative case, the optician enters the numeral for the offset which appears in a window indicated by 731 in FIG. 10. A chamfer ratio of 0% and an offset of 0.3 means that the edge along the entire periphery of the bevelled lens is chamfered uniformly by an amount of 0.3 mm.

Figure 13:
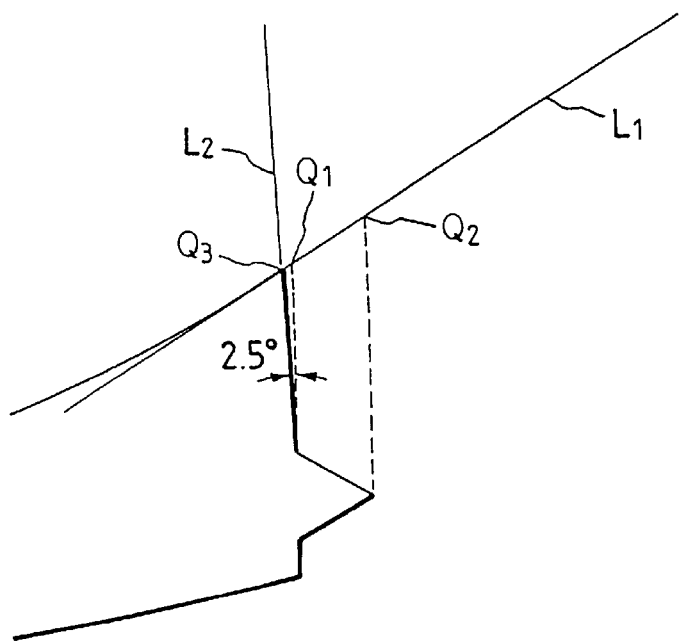
FIG. 13 is a diagram illustrating how to determine the edge position which is obtained as a consequence of finishing processing in the case where bevelling is performed to produce a tapered bevel bottom.
Figure 15A:
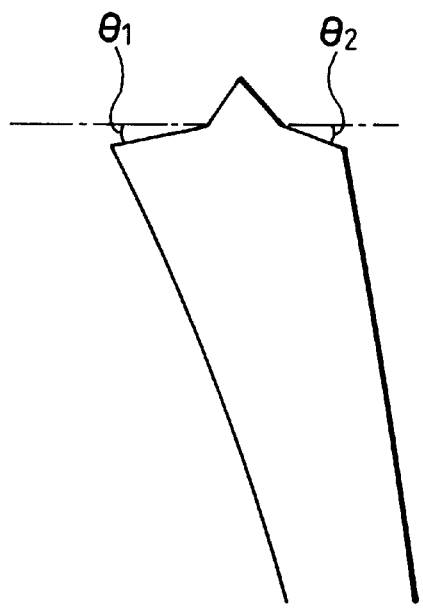
FIGS. 15(a) and 15(b) illustrate a lens processed to have a tapered surface on the bevel bottom in the beveling, and a lens processed to have a tapered edge surface in the planing, respectively.
Figure 15B:
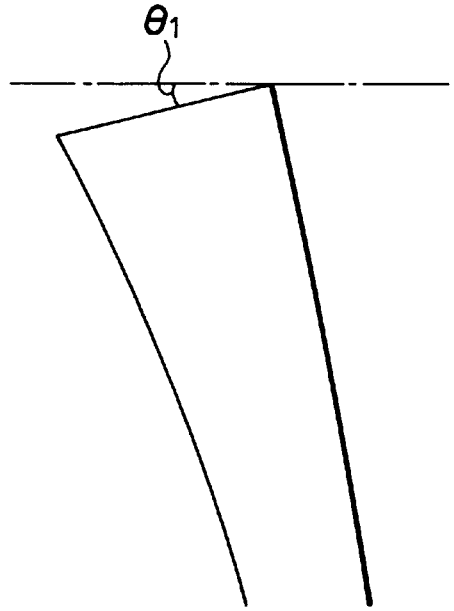
Figure 16:
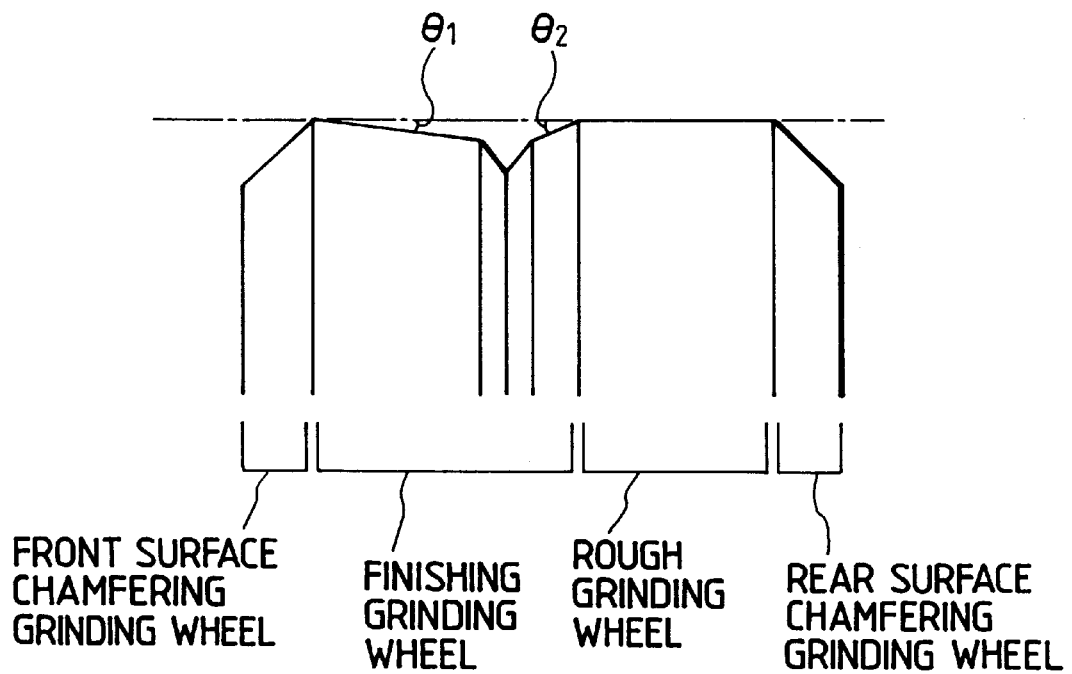
FIG. 16 illustrates a grinding wheel used for processing a lens into the form shown in FIG. 15(a) or FIG. 15(b).

If the apparatus is preset to bevel the lens with a finishing grinding wheel so as to provide a tapered surface on the bevel bottom (see FIG. 15a) or to plane the lens so as to provide a tapered edge surface (see FIG. 15b), the position of the edge, which is expected as a consequence of the finish-processing, is determined as a basis for calculating the amount of chamfer. Since the angle formed by the tapered surface of the finishing grinding wheel is known (see FIG. 16), the position of the edge to be eventually obtained can be easily determined if the curve of the front (or rear) surface of the lens is known. For approximation, the following method may be adopted (see FIG. 13). In bevelling, the edge positions at two points Q1 (where an inclined surface of the bevel crosses the bevel shoulder) and Q2 (for the bevel apex), both corresponding to a radius vector angle, are determined for the entire periphery of the lens by means of the lens thickness measuring apparatus 400. Connect the determined edge positions at the two points Q1 and Q2 with a straight line L1 (even for the curve of the rear surface of the lens, the departure between each of the two points and the position of the edge which is obtained as a consequence of processing is so small that for practical purposes, one may safely conclude that the position of the edge which is obtained as a consequence of processing lines on the straight line connecting said two points), and a point Q3 at which line L1 crosses a straight line L2 corresponding to the angle formed by the tapered surface of the finishing grinding wheel is substituted for the position of the edge which is obtained as a consequence of finish-processing.

It is not absolutely necessary to measure the edge position at two points as described above; if the lens has only a small degree of curvature, chamfering that is just almost desired can be accomplished by setting a chamfer ratio higher than a certain value (say, 6% or higher if the angle formed by the tapered surface of the finishing grinding wheel is 2.5°).

Figure 14:
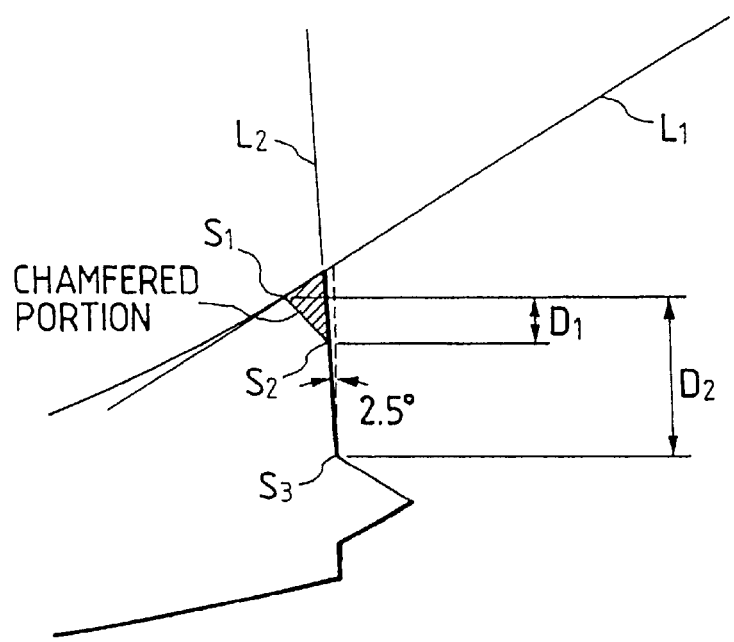
FIG. 14 is a diagram illustrating a modified method of determining the ratio of chamfering the lens edge.

Another way to determine the ratio of chamfering the lens edge is as follows (see FIG. 14). Suppose here that the straight line L1 (for its definition, see above) crosses the working surface of the chamfering wheel at point S1 and that the chamfering wheel crosses the edge surface at point S2, which is spaced from S1 by a distance of D1. If the distance from S1 to S3 at which an oblique line of the bevel crosses the bevel shoulder is written as D2, the chamfer ratio which is expressed by D1/D2 is determined in such a way that point S2 is the processing point P.

On the basis of the thus measured information on the edge position, the calculated information on the bevel position and the entered value for the amount of chamfer, the control unit 600 determines the processing point P for edge chamfering along the entire periphery of the lens, thereby producing a locus of lens chamfering $(x_n, y_n, z_n)$ (n=1, 2, 3, . . . N). Depending on the edge thickness of the lens and the position of its bevel, the rear surface of the lens may not have a bevel shoulder in several areas. In obtaining the locus of lens chamfering, such areas are excluded from the chamfering operation.

Figure 12:
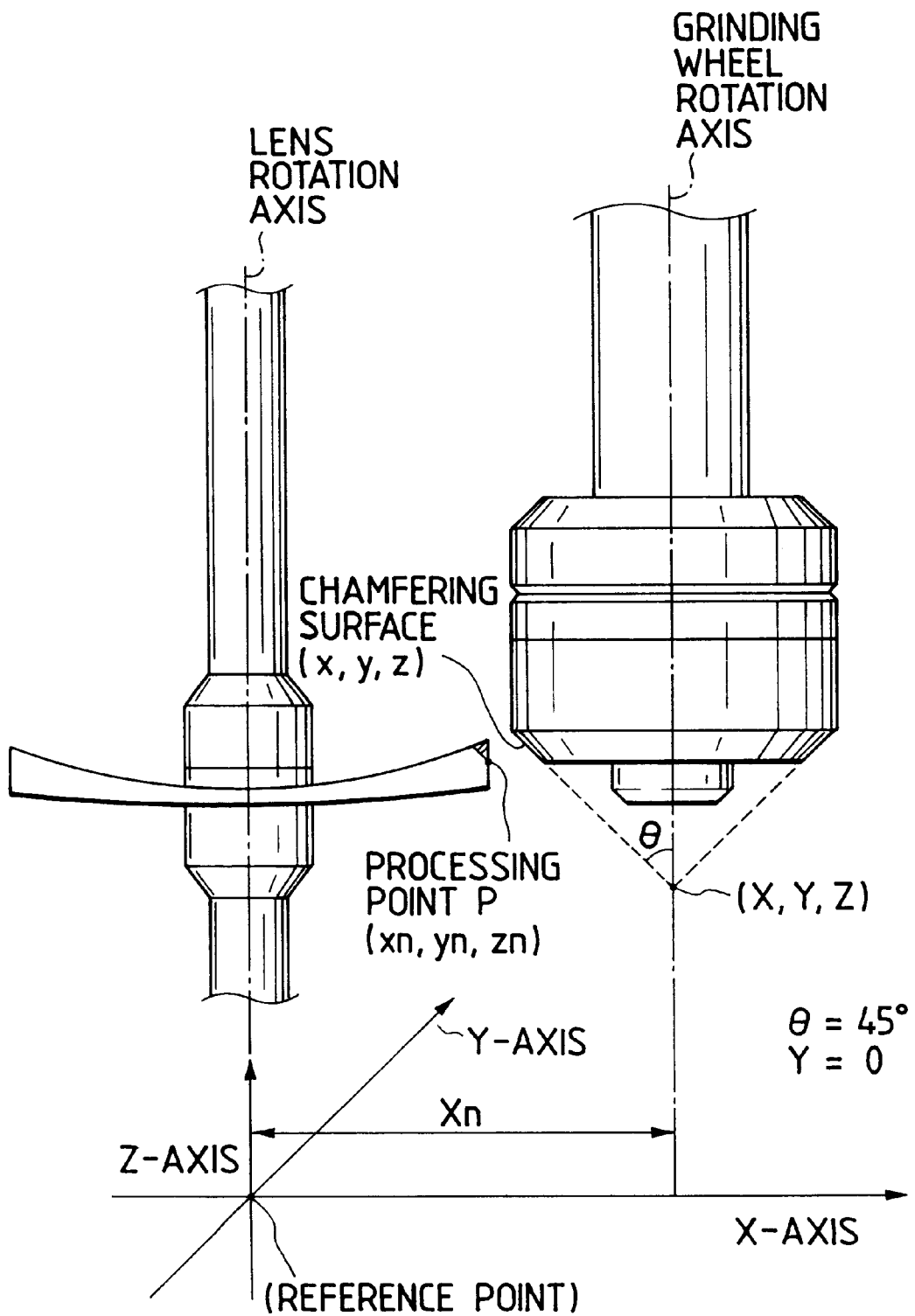
FIG. 12 is a diagram illustrating a method for determining chamfering data such as to ensure that a chuck holder will not be interfered with by a chamfering wheel.

Subsequently, the control unit 600 bases on the obtained locus of lens chamfering to perform corrective calculations for determining data on chamfering in order to ensure that the chuck shafts 121 and 152 (chuck holer) will not be interfered with by any grinding wheel (see FIG. 12).

Consider an orthogonal coordinate system in which the X-axis represents a direction in which the chamfering wheel moves to either right or left of the grinding apparatus with reference to the lens rotating shafts (chuck shafts 121 and 152), the Y axis represents a direction in which the grinding wheel moves back and forth and the Z axis represents a height direction. Then, the surface of the chamfering wheel is expressed by the following equation:

$$(x-X)^2+(y-Y)^2 =(z-Z)^2\tan^2\theta \quad \text{(eq. 1)}$$

where X is the distance along the X-axis between the centers of the lens rotating shaft and the grinding wheel rotating shaft, Y is the distance along the Y-axis between the centers of the lens rotating shaft and the grinding wheel rotating shaft, Z is the distance taken along the Z-axis from a reference position to the imaginary apex of a conical grinding wheel, and θ is the angle of inclination of the grinding wheel's surface. Hence, Z is expressed by:

$$Z=z-\{1/\tan^2\theta\cdot[(x-X)^2+(y-Y)^2]\}^{1/2} \quad \text{(eq. 2)}$$

With the apparatus of the embodiment, Y=0 and θ=45 degrees, so tan θ=1 and eq. 2 can be rewritten as:

$$Z=z-\{(x-X)^2+y^2\}^{1/2} \quad \text{(eq. 3)}$$

Substituting the locus of lens chamfering $(x_n, y_n, z_n)$ into eq. 3 as respective values of x, y and z, one can determine a maximum value of Z so as to calculate the height of the chamfering wheel (displacement from the reference position) which permits effective use of the width of the chamfering wheel while ensuring that the lens rotating shaft will not be interfered with any grinding wheel. In the case of using a cylindrical coordinate system, x and y in eq. 2 are transformed to a polar system.

The procedure for calculating the value of Z in eq. 2 is as follows. First, the value of X is determined. The following description assumes the case of chamfering the rear surface of the lens by means of the chamfering wheel 33 (or 36).

Also assume that the working point of the chamfering wheel which contacts the processing point P is at a diameter of 54 mm which is slightly above the lowest point of the wheel. First, an arithmetic operation for achieving a correction of two-dimensional processing (i.e., correction of the chamfering wheel's diameter) is performed (see, for example, commonly assigned U.S. Pat. No. 5,347,762; if desired, approximation may be effected by providing an offset to the locus of correction which is performed in a rough processing step) and the resulting locus is used as a reference locus of chamfering. This is compared with a minimal locus of chamfering (which is preset by adding the diameter of the chuck holder to the maximum diameter of the chamfering wheel and also adding a distance of allowance) and in areas where the reference locus is smaller than the minimum locus of chamfering, the values of the latter are substituted, thereby producing a corrected reference locus $X_n$.

Subsequently, the value of X at a given position referenced to the lens rotating shaft is determined from the corrected reference locus for chamfering $X_n$. The determined value of X and the lens chamfering locus $(x_n, y_n, z_n)$ are substituted into eq. 3 to determine a maximum value of Z, or Zmax. The corresponding point of processing is used as the processing point of chamfering. In the next step, the locus of lens chamfering $(x_n, y_n, z_n)$ is rotated about the lens rotating shaft through a small unit angle and the corresponding value of Zmax is determined by repeating the procedure described above. With the angle of rotation being written as $\zeta_i$ i (i=1, 2, 3, . . . , N), Zmax is calculated along the entire periphery of the lens, thereby producing corrected data on chamfering $(X_i, Zmax_i, \zeta_i)$ (i=1, 2, 3, . . . , N) where $Zmax_i$ is a maximum value of Z at each $\zeta_i$ and $X_i$ is the corresponding value of $X_n$.

In this method, the value of X (the distance between the centers of the lens rotating shaft and the chamfering wheel rotating shaft) is first determined for correcting the amount of movement of the chamfering wheel along the Z-axis (in a direction parallel to the optical axis of the lens) and this enables chamfering to be performed with the larger-diameter portion of the grinding wheel even for the lens edge which corresponds to the aforementioned minimal locus of chamfering. Thus, more effective use of the width of the chamfering wheel can be realized to reduce the smallest diameter of the lens that can be processed. As a further advantage, determining the value of X in the first step provides ease in controlling the minimal lens diameter while avoiding the interference.

If the position of the surface of the chamfering wheel which is at the maximum diameter in the direction of Z-axis, as calculated from $Zmax_i$ (and which is Z $max_i$+30 mm in the embodiment), is lower than the edge position determined by edge thickness measurement at the position of $Zmax_i$ (the edge position at the rear surface in the case under consideration), the control unit 600 concludes that "chamfering is impossible" and signals to the optician by providing a relevant message on the display unit 10.

As the result of the aforementioned calculation of chamfering data, the display unit 10 provides a simulating image based on the calculated processing data, as typically shown in FIG. 10. The image comprises a lens shape display 710 based on the target lens shape data, as well as a cursor 711 rotating about the processing center, a mark 712 indicating the position of a maximum edge thickness and a mark 713 indicating the position of a minimum edge thickness. The image also includes a chamfered cross-sectional shape 720 at the edge position where the rotating cursor 711 is located.

The initial screen displays a chamfered cross-sectional shape at the mark 712 indicating the position of a maximum edge thickness. If a switch on the input unit is depressed to rotate the curser 711 about the processing center, the chamfered cross-sectional shape 720 will assume a different shape corresponding to information on the associated radius vector.

To change the chamfered shape, the numerical values of the chamfer ratio 730 and the offset amount 731 are changed by depressing associated switches on the input unit 11. On the basis of the reentered values, the control unit 600 recalculates the data on chamfering and displays the chamfered cross-sectional shape on the basis of the recalculated data.

If the values of chamfer ratio and offset amount are preliminarily tabulated as shown in FIG. 11 so that the optician can select appropriate values, the procedure for changing the respective values can be made less cumbersome to provide greater ease.

The above-described calculation of chamfering data and simulation of chamfering are performed separately for the rear and front lens surfaces.

When the desired chamfered cross-sectional shape is obtained, the optician will depress START switch again. In response to the resulting signal, rough processing, bevelling and chamfering are automatically performed in succession.

In rough processing, both right and left rough grinding wheels 30 are brought to the same height as the lens and, thereafter, the lens grinding parts 300R and 300L are driven to slide towards the lens. The right and left rough grinding wheels 30 are moved towards the lens as they rotate, thereby gradually grinding the lens from two directions. The amounts of movement of the right and left rough grinding wheels 30 are controlled independently of each other on the basis of the eyeglass frame shape information. The control unit 600 also monitors the rotational torque (load current) of each of the two servo motors 310R and 310L such that when a predetermined upper limit of the rotational torque has been reached, the control unit 600 stops the rotation of the lens and, at the same time, it stops the movement towards the lens of the rough grinding wheel 30 which has reached the upper torque limit (or causes the same rough grinding wheel to reverse a little). This provides for prevention of an excessive load from being exerted on the lens, thereby avoiding troubles such as lens breakage. When the rotational torque has decreased to a specified torque-up permission level, the control unit 600 allows the lens to rotate again, thereby restarting the grinding operation.

When the rough processing step ends, the process goes to a bevelling step. On the basis of the bevelling data stored in the data memory 603, the control unit 600 performs bevelling by controlling the height of the V-groove of the finishing grinding wheel 31 (or the finishing grinding wheel 34 if the entered instruction is for specular processing (polishing)) and its movement towards the lens.

When the bevelling step ends, the process then goes to a chamfering step. On the basis of the chamfering data stored in the data memory 603, the control unit 600 controls the movement of the front surface chamfering wheel 32 and the rear surface chamfering wheel 33 both vertically and towards the lens (if the entered instruction is for specular processing (polishing), the chamfering wheels 35 and 36 are substituted).

The height of the chamfering wheel 32 is controlled to be such that the point at a diameter of 54 mm which is slightly greater than the minimum diameter coincides with the processing point P on the edge of the rotating lens. This control, combined with the movement of the chamfering wheel 32 towards the lens ensures that the edge of the lens is automatically chamfered to the desired shape. As a result, the width of the chamfering wheel is effectively utilized to accomplish the intended chamfering.

While the foregoing embodiment relates to bevelling, it should be noted that the ratio of chamfering to be effected after planing is determined for the edge thickness of the area extending from the front to the rear surface of the lens. The amount of offset can also be entered in a similar manner. The control unit 600 obtains data on the lens chamfering locus on the basis of these inputs and performs the above-described corrective calculation to obtain chamfering data.

To effect chamfering in varying amounts in different areas of the lens shape, the edge thickness (or the width of the bevel shoulder) may be divided by a desired ratio over the entire periphery or, alternatively, ranges for effecting chamfering in varying amounts may be designated over the entire edge periphery. For example, given the lens shape display 710 on the simulating image shown in FIG. 10, not only the front or rear surface of the lens to be chamfered but also the range for a varied amount of chamfer (to be specified by start and end points) and the amount of chamfering of that range are designated. The amount of chamfer is not only constant but also variable by inputting different values of ratio and offset amount. In the case under consideration, correction should be made in order to provide a smooth connection between adjacent designated ranges.

The apparatus of the embodiment can also be adapted to process eyeglass lenses particularly those for rimless eyeglasses, such that a portion of the front or rear lens surface is chamfered for providing a special effect in design. To perform such special-design chamfering, a generalized chamfering method may be stored in a memory to produce chamfering data in association with other processing data or, alternatively, chamfering data corresponding to the target lens shape may be stored in a memory. The apparatus, after being supplied with the chamfering data, controls the actions of the lens rotating shaft and the lens grinding parts R and L in such a way that the lens is ground to a designated chamfered shape.

The foregoing embodiment has been described with reference to an apparatus having both the lens and grinding wheel rotating shafts mounted in a vertical direction but this is not the sole case of the invention and it is also applicable to an apparatus of such a type that the lens rotating shaft and the rotating shaft of the chamfering wheel (which grinds the angular edge portions of the lens) are both horizontal, and a carriage that holds the lens rotating shaft is pivoted or rotated.

The invention is also applicable to an apparatus having a chamfering wheel of which the rotating shaft is perpendicular to the lens rotating shaft. In this case, the calculation of chamfering data may be accomplished by performing coordinates transformation in such a way that the rotating shaft of the chamfering wheel is rotated through 90 degrees to coincide with the direction of the lens rotating shaft.

In the foregoing embodiment, chamfering data is obtained by the optician who manually enters the chamfer ratio and the amount of offset. If desired, the entire process from rough processing to final processing can be automated by providing a program in which the chamfering data is variable with other data such as edge thickness data (or even data indicating as to whether the processing to be performed is bevelling or planing or whether the eyeglasses with which the lens is to be used are of a rimless type). If desired, the processing data which is to be determined by the automated processing program may be adapted to be variable.

What is claimed is:

1. A lens grinding apparatus for processing a periphery of an eyeglass lens, comprising:

input means for entering data on a processing shape of the lens;

detecting means for detecting an edge position of the lens on the basis of the entered shape data;

first calculating means for determining processing data on a rough and a fine processing of the lens on the basis of the edge position detected by said detecting means and the shape data entered into said input means;

angular edge portion processing means which has a grinding wheel for processing angular edge portions of the finely processed lens and for moving a shaft of said grinding wheel relative to a shaft holding the lens;

second calculating means for setting a plurality of zones of the lens and for performing different calculations in different zones such that an amount of processing of the angular edge portions is determined in correspondence with a radius vector angle of the lens; and means for controlling the processing of the lens on the basis of the results of calculation by said first and second calculating means.

2. The lens grinding apparatus as set forth in claim 1, wherein said second calculating means has means for dividing by a specified ratio in accordance with a specified format an edge thickness of the lens determined on the basis of the result of detection by said detecting means, thereby determining a point of division along the edge thickness.

3. The lens grinding apparatus as set forth in claim 2, wherein said second calculating means further includes means for offsetting the point of division in a direction parallel to the shaft holding the lens.

4. The lens grinding apparatus as set forth in claim 2, wherein the edge thickness to be divided by said dividing means is a thickness of a bevel bottom after bevel or groove formation.

5. The lens grinding apparatus as set forth in claim 1, wherein said second calculating means has means by which an operator designates the zones in which the different calculations are performed.

6. The lens grinding apparatus as set forth in claim 5, wherein said zone designating means has means for providing a graphic display of an approximate shape of the processed lens on the basis of the results of calculation by said first and second calculation means.

7. The lens grinding apparatus as set forth in claim 1, wherein said input means has input means for entering data on a processing shape of a rimless eyeglass lens.

8. A lens grinding apparatus for processing a periphery of an eyeglass lens, comprising:

input means for entering data on a processing shape of the lens;

detecting means for detecting an edge position of the lens on the basis of the data entered into said input means;

first calculating means for determining processing data on a rough and a fine processing of the lens on the basis of the edge position detected by said detecting means and the data entered into said input means;

chamfering means which has a chamfering grinding wheel for chamfering angular edge portions of the finely processed lens and for moving a shaft of said chamfering grinding wheel relative to a shaft holding the lens;

second calculating means for varying an amount of chamfer in correspondence with a radius vector angle of the lens on the basis of the processing data obtained by said first calculating means; and means for controlling the processing of the lens on the basis of the results of calculation by said first and second calculating means.

9. The lens grinding apparatus as set forth in claim 8, wherein said second calculating means divides by a specified ratio in accordance with a specified format for an entire periphery of the lens an edge thickness of the lens determined on the basis of the result of detection by said detecting means thereby determining a point of division along the edge thickness of the lens.

10. The lens grinding apparatus as set forth in claim 9, wherein the edge thickness to be divided by said dividing means is a thickness of a bevel bottom after bevel or groove formation.

11. The lens grinding apparatus as set forth in claim 9, wherein said second calculating means further includes means by which the point of division as obtained through division by said dividing means on the basis of a specified ratio is offset in a direction parallel to the shaft holding the lens.

12. The lens grinding apparatus as set forth in claim 11, which further includes means for an operator to enter at least one of the ratio of division and the amount of the offset.

13. The lens grinding apparatus as set forth in claim 8, which further includes means for providing a graphic display of a shape of the angular edge portions of the lens on the basis of the results of calculation by said first and second calculating means.

14. The lens grinding apparatus as set forth in claim 13, which further includes input means for changing the shape of said displayed angular edge portions.

15. The lens grinding apparatus as set forth in claim 13, which further includes means by which the angular edge portions to be displayed on said display means is designated either on demand or in advance.

16. The lens grinding apparatus as set forth in claim 8, wherein said second calculating means includes means which sets a plurality of zones of the lens and which performs different calculations in different zones such that the amount of chamfering of the angular edge portions is determined in correspondence with the radius vector angle of the lens.

17. The lens grinding apparatus as set forth in claim 8, further including lens holding means which includes said shaft holding the lens; and wherein said second calculating means includes:

means for determining a chamfering locus in correspondence with the radius vector angle of the lens;

calculating means for determining a reference chamfering locus on the basis of said chamfering locus;

calculating means for determining a corrected locus by correcting said reference chamfering locus such as to ensure that the chamfering grinding wheel will not interfere with the lens holding means; and calculating means for determining a chamfering position for successive angles of rotation of the lens about an axis of said shaft holding the lens on the basis of said corrected locus and said chamfering locus, wherein said means for controlling controls the rough and fine processing of the lens by said processing data, and controls the chamfering operation on the basis of said chamfering position and said corrected locus.

18. A lens grinding apparatus for processing a periphery of an eyeglass lens, comprising:

input means for entering data on a processing shape of the lens;

detecting means for detecting an edge position of the lens on the basis of the data entered into said input means;

first calculating means for determining processing data on a rough and a fine processing of the subject lens on the basis of the edge position detected by said detecting means and the data entered into said input means;

chamfering means which has a chamfering grinding wheel with conical grinding surfaces for chamfering angular edge portions of the finely processed lens and for moving a shaft of said chamfering grinding wheel relative to means for holding the lens;

means for determining a chamfering locus in correspondence with a radius vector angel of the lens;

second calculating means for determining a reference chamfering locus on the basis of said chamfering locus;

third calculating means for determining a corrected locus by correcting said reference chamfering locus such as to ensure that the chamfering grinding wheel will not interfere with the lens holding means;

fourth calculating means for determining a chamfering position for successive angles of rotation on the basis of said corrected locus and said chamfering locus; and means for controlling the rough and fine processing by said processing data and for controlling the chamfering operation on the basis of said chamfering position and said corrected locus.

19. The lens grinding apparatus as set forth in claim 18, wherein a shaft of said lens holding means and the shaft of said chamfering grinding wheel are disposed parallel to each other and wherein said fourth calculating means determines a maximum value of Z in the following equation:

$$(x-X)^2+(y-Y)^2=(z-Z)^2\tan^2\theta$$

where

X: is a distance along an X-axis between centers of the lens holding means and the chamfering wheel;

Y: is a distance along a Y-axis between the centers of the lens holding means and the chamfering wheel;

Z: is a distance along a Z-axis from a reference position to an imaginary apex of the chamfering wheel; and θ: is an angle of inclination of a surface of the chamfering wheel along the Z-axis, where the X- and Y-axes are orthogonal coordinate axes in a plane perpendicular to the shaft of said lens holding means, and the Z-axis is a coordinate axis in a direction parallel to the shaft of the lens holding means.

20. The lens grinding apparatus as set forth in claim 19, wherein a signal for "processing impossible" is sent to an operator when a position for a maximum diameter of said chamfering grinding wheel as determined from the maximum value of said Z is smaller than a specified reference.

21. A lens grinding apparatus for processing a periphery of an eyeglass lens, comprising:

an input unit to enter data on a processing shape of the lens;

a lens thickness measuring section which detects an edge position of the lens on the basis of the entered shape data;

a control unit which performs a first calculation to determine processing data on a rough and a fine processing of the lens on the basis of the edge position detected by said lens thickness measuring section and the shape data entered into said input unit;

an angular edge portion processing mechanism which has a grinding wheel to process angular edge portions of the finely processed lens and which moves a shaft of said grinding wheel relative to a shaft holding the lens;

wherein said control unit performs a second calculation to set a plurality of zones of the lens and performs different calculations in different zones such that an amount of processing of the angular edge portions is determined in correspondence with a radius vector angle of the lens; and wherein said control unit controls the processing of the lens on the basis of the results of said first and second calculations.

22. The lens grinding apparatus as set forth in claim 21, wherein said control unit divides by a specified ratio in accordance with a specified format an edge thickness of the lens determined on the basis of the result of detection by said lens thickness measuring section, thereby determining a point of division along the edge thickness.

23. The lens grinding apparatus as set forth in claim 22, wherein said control unit further offsets the point of division in a direction parallel to the shaft holding the lens.

24. The lens grinding apparatus as set forth in claim 22, wherein the edge thickness to be divided by said control unit is a thickness of a bevel bottom after bevel or groove formation.

25. The lens grinding apparatus as set forth in claim 21, wherein said control unit is adapted to receive instructions from an operator designating zones in which the different calculations are performed.

26. The lens grinding apparatus as set forth in claim 25, further comprising a display unit which displays an approximate shape of the processed lens on the basis of the results of said first and second calculations by said control unit.

27. The lens grinding apparatus as set forth in claim 21, wherein said input unit is adapted to receive data on the processing shape of a rimless eyeglass lens.

28. A lens grinding apparatus for processing a periphery of an eyeglass lens, comprising:

an input unit to enter data on a processing shape of the lens;

a lens thickness measuring section which detects an edge position of the lens on the basis of the data entered into said input unit;

a control unit which performs a first calculation to determine processing data on a rough and a fine processing of the lens on the basis of the edge position detected by said lens thickness measuring section and the data entered into said input unit;

a chamfering mechanism which has a chamfering grinding wheel and which chamfers angular edge portions of the finely processed lens and which moves a shaft of said chamfering grinding wheel relative to a shaft holding the lens;

wherein said control unit performs a second calculation which varies an amount of chamfer in correspondence with a radius vector angle of the lens on the basis of the processing data obtained by said first calculation; and wherein said control unit controls the processing of the lens on the basis of the results of calculation by said first and second calculations.

29. The lens grinding apparatus as set forth in claim 28, wherein said control unit divides by a specified ratio in accordance with a specified format for an entire periphery of the lens the edge thickness of the lens determined on the basis of the result of detection by said lens thickness measuring section, thereby determining a point of division along the edge thickness.

30. The lens grinding apparatus as set forth in claim 29, wherein the edge thickness to be divided by said control unit is a thickness of a bevel bottom after bevel or groove formation.

31. The lens grinding apparatus as set forth in claim 29, wherein said control unit further offsets the point of division in a direction parallel to the shaft holding the lens.

32. The lens grinding apparatus as set forth in claim 31, wherein said control unit is adapted to receive instructions by an operator for at least one of the ratio of division and the amount of the offset.

33. The lens grinding apparatus as set forth in claim 28, which further includes a display unit which provides a graphic display of a shape of the angular edge portions of the lens on the basis of the results of said first and second calculations.

34. The lens grinding apparatus as set forth in claim 33, wherein said input unit is adapted to receive instructions for changing the shape of said displayed angular edge portions.

35. The lens grinding apparatus as set forth in claim 33, wherein the angular edge portions to be displayed on said display unit is designated on demand or in advance.

36. The lens grinding apparatus as set forth in claim 28, wherein said control unit further sets a plurality of zones of the lens and performs different calculations in different zones such that an amount of chamfering of the angular edge portions is determined in correspondence with the radius vector angle of the lens.

37. The lens grinding apparatus as set forth in claim 28, further comprising a lens holding section which includes said shaft holding the lens; and wherein said control unit further:

determines a chamfering locus in correspondence with the radius vector angle of the lens;

determines a reference chamfering locus on the basis of said chamfering locus;

determines a corrected locus by correcting said reference chamfering locus such as to ensure that the chamfering grinding wheel will not interfere with the lens holding section; and determines a chamfering position for successive angles of rotation of the lens about an axis of said shaft holding the lens on the basis of said corrected locus and said chamfering locus, and wherein control unit further controls the rough and fine processing of the lens by said processing data, and controls the chamfering operation on the basis of said chamfering position and said corrected locus.

38. A lens grinding apparatus for grinding a periphery of an eyeglass lens, comprising:

input unit to enter data on a processing shape of the lens;

a lens thickness measuring section which detects an edge position of the lens on the basis of the data entered into said input unit;

a control unit which performs a calculation to determine processing data on a rough and a fine processing of the lens on the basis of the edge position detected by said lens thickness measuring section and the data entered into said input unit;

a chamfering mechanism which has a chamfering grinding wheel with conical grinding surfaces for chamfering angular edge portions of the finely processed lens and which moves the shaft of said chamfering grinding wheel relative to a lens holding mechanism;

wherein said control unit further determines a chamfering locus in correspondence with a radius vector angel of the lens; and wherein said control unit further:

determines a reference chamfering locus on the basis of said chamfering locus, performs a third calculation to determine a corrected locus by correcting said reference chamfering locus such as to ensure that the chamfering grinding wheel will not interfere with the lens holding mechanism;

performs a fourth calculation to determine a chamfering position for successive angles of rotation on the basis of said corrected locus and said chamfering locus;

controls the rough and fine processing by said processing data; and controls the chamfering operation on the basis of said chamfering position and said corrected locus.

39. The lens grinding apparatus as set forth in claim 38, wherein a shaft of said lens holding mechanism and the shaft of said chamfering grinding wheel are disposed parallel to each other and wherein said fourth calculation determines a maximum value of Z in the following equation:

$$(x-X)^2+(y-Y)^2=(z-Z)^2\tan^2\theta$$

where

X: is a distance along an X-axis between centers of the lens holding mechanism and the chamfering wheel;

Y: is a distance along a Y-axis between the centers of the lens holding mechanism and the chamfering wheel;

Z: is a distance along a Z-axis from a reference position to an imaginary apex of the chamfering wheel; and θ: is an angle of inclination of a surface of the chamfering wheel along the Z-axis, where the X- and Y-axes are orthogonal coordinate axes in a plane perpendicular to the shaft of said lens holding mechanism, and the Z-axis is a coordinate axis in a direction parallel to the shaft of the lens holding mechanism.

40. The lens grinding apparatus as set forth in claim 39, wherein a signal for "processing impossible" is sent to an operator when a position for a maximum diameter of said chamfering grinding wheel as determined from the maximum value of said Z is smaller than a specified reference.

* * * * *

UNITED STATES PATENT AND TRADEMARK OFFICE
CERTIFICATE OF CORRECTION

PATENT NO. : 6,099,383
DATED : August 8, 2000
INVENTOR(S) : Toshiaki Mizuno, Ryoji Shibata Page 1 of 1

It is certified that error appears in the above-identified patent and that said Letters Patent is hereby corrected as shown below:

The following U.S. and foreign references listed below were omitted from the face of the Letters Patent as well as foreign priority data. Please include all of the references and prioirty data listed herein.

Title page,
Item [56] 5,363,597    11/1994  Gottschald    451/69

| | | |
|---|---|---|
| A1 0 510 462 | 10/28/1992 | Europe |
| 1-271156 | 10/30/1989 | Japan |
| 2-15960 | 01/19/1990 | Japan |
| 2-65961 | 03/06/1990 | Japan |
| 2-152759 | 06/12/1990 | Japan |
| 9-253999 | 09/30/1997 | Japan |
| 9-254000 | 09/30/1997 | Japan |
| 3-20603 | 01/29/1991 | Japan |
| 7-186025 | 07/25/1995 | Japan |
| 2-65960 | 03/06/1990 | Japan |

Item [30],
Priority Data - Foreign Applications:

Japanese P. Hei 9-41476-02/10/1997
Japanese P. Hei 9-41477-02/10/1997
Japanese P. Hei 9-41478-02/10/1997

Signed and Sealed this

Eleventh Day of September, 2001

Attest:

NICHOLAS P. GODICI
Attesting Officer   Acting Director of the United States Patent and Trademark Office